३,३३८,९६७
PROCESS FOR PREPARING SECONDARY-ALKYL PRIMARY AMINES FROM OLEFINS
Ralph H. Potts, La Grange, Eugene J. Miller, Wheaton, and Ago Mais, La Grange Park, Ill., assignors to Armour and Company, Chicago, Ill., a corporation of Delaware
No Drawing. Filed Sept. 17, 1964, Ser. No. 397,287
19 Claims. (Cl. 260—583)

This invention relates to a process for preparing secondary-alkyl primary amines from olefins and the products thereby. More particularly, this invention relates to a process for amidating olefins with a nitrile and water in a hydrogen fluoride medium resulting in N-monosubstituted secondary-alkyl amides which are hydrolyzed to secondary-alkyl primary amines. Of particular importance is the process for producing secondary-alkyl primary amines from alpha-olefins. Our invention further relates to the novel class of N-monosubstituted secondary-alkyl amides which can be isolated if desired, and which will readily undergo hydrolysis resulting in a novel class of secondary-alkyl primary amines having unique properties. These amines may be further reacted to form a large number of new amine derivatives.

The process of our invention using hydrogen fluoride as a reaction medium and catalytic agent, is especially favorable in view of economic considerations of commercial production according to our invention. The use of hydrogen fluoride provides special advantages in the simplicity of an efficient and economical recovery system for a continuously recycling process plant. Further, the portion of the process of our invention, which is carried out in a hydrogen fluoride medium, is found to proceed at surprisingly low temperatures with minimal exothermic reaction heat generated.

An object of this invention is to provide a novel class of secondary-alkyl primary amines produced from olefins, and a novel process of their production.

A further object is to produce secondary-alkyl primary amines from olefins in a reaction resulting in minimal exothermic conditions and affording efficient, economical recovery of catalyst chemicals following the reaction.

Still another specific object is to effect the high yield amidation of olefins in the presence of hydrogen fluoride to result in N-monosubstituted secondary-alkyl amides which may be isolated, or may be hydrolyzed under acidic or basic conditions to result in a novel class of secondary-alkyl primary amines.

A further specific object is to effect high yield amidation of alpha-olefins by a nitrile and water in the presence of hydrogen fluoride to result in N-mono-substituted secondary-alkyl amides which may be isolated, or may be hydrolyzed under acid or basic conditions to result in secondary-alkyl primary amines.

A further object is to provide a process wherein the isomeric composition of the amine products may be controlled according to the order of addition of reactants.

A still further object is to provide a novel series of secondary-alkyl primary amines which may be further reacted to result in a novel class of amine derivatives having unique properties.

These and other objects of our invention are accomplished by reacting an olefin with a nitrile and water in the presence of hydrogen fluoride to form an intermediate product, then reacting the intermediate product with a hydrolysis agent to form secondary-alkyl primary amines, and thereafter separating said amines from the reaction mixture.

In a specific embodiment, our invention may be exemplified by the following reaction:

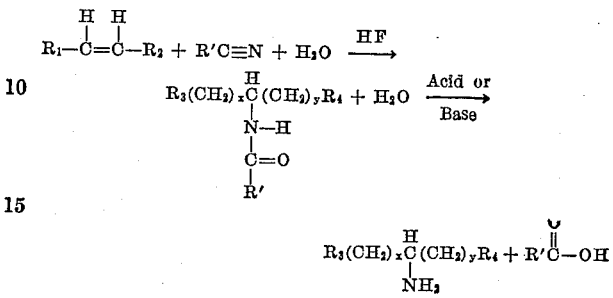

wherein $R_1$ is selected from the group consisting of hydrogen, an aryl radical, and an aliphatic hydrocarbon radical, $R_2$ is selected from the group consisting of an aryl radical and an aliphatic hydrocarbon radical, and wherein the total molecule contains from 3 to about 48 carbon atoms; $R'$ is selected from the group consisting of hydrogen, an aliphatic hydrocarbon radical having from 1 to about 21 carbon atoms inclusive, an aryl radical, an amino radical, and metallic salts of an amino radical; $x$ and $y$ are integers having a sum from 1 to about 47; and $R_3$ and $R_4$ are radicals derived from the occurrences of $R_1$ and $R_2$ in the olefin reactant.

The aryl and aliphatic hydrocarbon radicals may be substituted wherein the substituted component may be selected from the group consisting of carboxy and amino radicals. The amino radical of $R'$ may be substituted. The aliphatic hydrocarbon radicals may be straight chain, branched chain, cyclic, saturated and unsaturated.

Also within our invention is the reaction wherein the olefinic reactant is a cyclic aliphatic compound. The cyclic olefinic reactant may be shown as

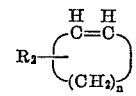

wherein $R_2$ has the same meaning as above and $n$ is an integer from 1 to about 10. There may be several occurrences of $R_2$ in the molecule.

It should be understood that an essential factor of the olefin reactant is the presence of the olefinic bonding in the molecule. Thus, a large number of olefins and substituted olefins may serve as reactants in the process of this invention. Polyolefins may also serve as the olefinic reactant. Mixtures of olefins may be used. Olefins suitable for reactants in the process of our invention may be obtained from any olefin source, such as from petroleum, either by direct separation or by treatment with heat or catalysts, or by chemical synthesis.

Examples of some suitable olefinic reactants coming within the above definitions and resulting in good yields include: butene, pentene, hexene, heptene, octene, nonene, decene, hendecene, dodecene, tridecene, tetradecene, hexadecene, octadecene, nonadecene, eicosene, oleic acid, cyclohexene, oleyl amine, and mixed alpha-olefins in fractions $C_6$–$C_7$, $C_7$–$C_9$, $C_9$–$C_{11}$, $C_{11}$–$C_{15}$, $C_{15}$–$C_{20}$, $C_{20}$–$C_{48}$, $C_9$–$C_{10}$, $C_{11}$–$C_{14}$, $C_{15}$–$C_{18}$, and $C_{18}$–$C_{20}$.

The above formulae of the products illustrate the isomeric amides and amines which result. Due to the carbonium ion mechanism, the nitrogen atom of the nitrile may attach to the carbon chain of the olefin not only at carbon sites of the original double bond, but also at carbon sites away from the original double bond. The isomeric composition of the amine product of our invention may be controlled by reaction conditions, thus resulting in a series of novel isomeric compositions having surprising properties and uses.

The reaction of our invention will proceed under a wide range of proportions of reactants. Where the mole ratio of nitrile to olefin is at least 1 to 1 the reaction stoichiometry is satisfied. An amount of nitrile in excess of the stoichiometric requirement is preferred. The mole ratio of nitrile to olefin from about 1.1 to 1.0 to about 4.0 to 1.0 has been found to be especially satisfactory. Additional nitrile may be used, but due to economic reasons is not desirable. The amount of hydrogen fluoride may be varied over wide ranges. While the hydrogen fluoride does have a catalytic-type effect, it also serves as the reaction medium. The mole ratio of hydrogen fluoride to olefin of greater than about 3 is preferred. The mole ratio of hydrogen fluoride to olefin of from about 8 to 25 has been found to be especially satisfactory. Greater amounts of hydrogen fluoride may be used. To satisfy the reaction stoichiometry the mole ratio of water to olefin must be at least 1.0 to 1.0. An excess of water is preferred. The mole ratio of water to olefin of more than about 10% excess water is preferred. The mole ratio of water to olefin of from about 1.0 to 1.0 to 1.3 to 1.0 has been found to be especially satisfactory. Hydrolysis of the intermediate amide may be effected with a hydrolysis reagent comprising any suitable acid or base in aqueous or alcohol solution. Preferred hydrolysis agents may be selected from the group consisting of aqueous sulfuric acid, aqueous sodium hydroxide, sodium hydroxide in alcohol and aqueous alcohol, aqueous potassium hydroxide, potassium hydroxide in alcohol and aqueous alcohol, and sodium methoxide in alcohol, the concentration being suitably about 50%. Good results have been obtained with concentrations from about 30 to 70%. Concentrations outside of this range will result in some hydrolysis. Where the mole ratio of amide to hydrolysis agent is greater than 1.0 to 1.0 the reaction stoichiometry is satisfied. Preferred mole ratios of amide to hydrolysis reagent are from about 1 to 3 to 1 to 6.

The reaction may be carried out over a wide range of temperatures. Temperatures from about —20° to 100° C. are suitable in the reaction of the olefin. The initial reactants may be introduced into the reactor at temperatures of less than 20° C. Preferred temperatures for introduction of the initial reactants into the reactor are from about 0° to —20° C. In procedures wherein olefins are added to other reactants already present in the reactor, improved results are obtained when the olefin is introduced into the reactor at temperatures above 19.4° C., the boiling point of hydrogen fluoride. The preferred olefin-nitrile-water reaction temperature is from about 25° to 60° C. Substantially higher reaction temperatures may be used, but excessively higher temperatures may result in undesirable darkening of the intermediate amide. The hydrolysis of the amide may take place over a wide range of temperatures. Good results have been obtained at temperatures from about 50° to 300° C., depending upon the hydrolysis agent. When sulfuric acid-aqueous solution is used, the preferred temperature is from about 100° to 120° C. When sodium hydroxide is used in aqueous or alcohol solution, the preferred temperature is from 150° to 250° C.

The reaction will proceed under wide range of pressure conditions. Pressures ranging from atmospheric to 20 atmospheres are satisfactory. The preferred pressure conditions are from atmospheric to 5 atmospheres. It is possible to use pressures greatly in excess of 20 atmospheres, but excessively higher pressures present the economic disadvantage of expensive pressure equipment.

The reaction is usually complete in from less than 1 minute to several hours. Good yields of the amide intermediate product have been obtained in from about 10 minutes to several hours, depending upon the particular reactants and conditions of the reaction. Good hydrolysis has been obtained in from about 1 to 100 hours. When sodium hydroxide-alcohol is used as a hydrolysis reagent, excellent results may be obtained in about 4 hours.

The process of our invention may be conducted either batch-wise or continuously. Any suitable apparatus, such as an autoclave made of or lined with corrosion resistant materials such as silver, stainless steel, copper, Monel, and the like, may be used.

The sequence of addition of reactants is determinative of the isomeric composition of the product obtained. Some nitrile will add to each carbon atom of the primary olefin structure, excepting the terminal carbon atoms, resulting in a product which is a mixture of isomers. The sequences wherein the olefin is the last reactant added result in a product rich in isomers wherein the point of attachment of the nitrogen atom is removed from the site of the original location of the double bond in the olefin molecule. Thus, with an aliphatic alpha-olefin reactant, the favored point of attachment of the nitrogen group is away from the beta-carbon atom toward the center of the carbon chain. Suitable addition sequences resulting in product isomeric compositions rich in isomers having attachment of the nitrogen group away from the site of the original olefinic bond include: addition of hydrogen fluoride, water and nitrile to a reactor and then addition of the olefin to the reactor; addition of hydrogen fluoride to a reactor, then the addition of nitrile and water followed by the addition of olefin; and other combinations wherein the olefin is the last reactant added.

In sequences of addition wherein the olefin is among the first reactants added to the reactor or at least added prior to the last reactant, or sequences wherein the addition of reactants is stepwise and the olefin is added prior to the last reactant, the reaction product is rich in isomers wherein the point of attachment of the nitrogen atom is at and adjacent to the site of the original location of the double bond in the olefin molecule. Thus in the alpha-olefin, the favored point of attachment of the nitrogen group is at and adjacent to the beta-carbon atom. Suitable addition sequences resulting in product isomer compositions rich in attachment of the nitrogen group at and adjacent to the site of the original olefinic bond include: addition of the olefin and nitrile to the reactor followed by the addition of hydrogen fluoride and water; stepwise individual addition in the order hydrogen fluoride, nitrile, olefin, and water; addition of hydrogen fluoride first, then nitrile, and then olefin and water simultaneously; and other sequences wherein the olefin is not the last added reactant.

While the exact isomeric composition of the amide and the amine products cannot be ascertained by present analytical methods, development of special chromatographic techniques have permitted us to generally describe our products. The results of chromatographic analysis of products of the process of our invention employing various modes of addition of reactants are shown in the examples which follow the description of our invention. The analysis do reliably show the variations in isomeric composition.

Upon the completion of addition of the reactants, the reaction mixture may be stirred at the desired temperature for sufficient time to result in high yields of amide. Reaction times of from about 10 to about 90 minutes have been found to be satisfactory depending upon reaction conditions. Of course, the reaction time can vary widely depending upon reaction conditions and reactants. The preferred olefin reaction temperature is from about 25° to about 60° C. In practice the reaction temperature is easily maintained. Surprisingly, we have found the exothermic heat of reaction, when using hydrogen fluoride according to our invention, to be much less than reactions using other acid catalysts.

The intermediate amide may be isolated from the reaction mixture by several techniques. Decomposition by water may be achieved by pouring the entire reaction mixture into a large excess of cold water. The product may then be extracted with ether, the extracts may be washed free of hydrogen fluoride, and the ether removed in vacuo. Another amide isolation technique which may be used is decomposition by heat wherein the excess hydrogen fluoride in the reaction mixture is driven off by heating to about 150°–160° C. with stirring. Decomposition by heat is especially well suited to production process methods. Further, the hydrogen fluoride driven from the reaction mixture by heat may be easily condensed for reuse. It must be realized that any effective method of isolating the amide from the reaction mixture may be used. Good results have been obtained in isolating N-monosubstituted secondary-alkyl amide; and specifically N-($C_{11}$–$C_{15}$ sec-alkyl) acetamide, N-($C_{11}$–$C_{15}$ sec-alkyl) formamide, and N-(sec-dodecyl) acetamide.

The N-monosubstituted secondary-alkyl amides produced according to our invention form a novel class of amides which we have found to be especially useful as intermediates in the preparation of a novel class of secondary-alkyl primary amines.

The amines produced according to our process may be separated from the reaction mixture by any suitable technique. We have found that good results may be obtained by cooling the reaction mixture to about room temperature, adding a large excess of water, separating the aqueous phase, and vacuum distilling the amine.

The process of our invention is especially effective in high yield preparation of secondary-alkyl primary amines from alpha-olefins. The secondary-alkyl primary amines, produced from alpha-olefins according to our invention, comprise a composition of isomers wherein the nitrogen atom is attached at various carbon sites in the molecule. Because of the carbonium ion mechanism, the possible point of attachment of the nitrogen atom of the nitrile group to the carbon chain of the alpha-olefin is not only at the beta carbon atom, but also at all other carbon sites toward the middle of the carbon chain. Theoretically, an alpha-olefin of $n$ carbon atoms can give rise to $$\frac{n}{2}-1$$

isomeric amines when $n$ is an even number, and $$\frac{n}{2}-\frac{1}{2}$$

isomeric forms when $n$ is an odd number. Following the processes of our invention, this proves to be the case. It has been pointed out above, and is clearly shown by the examples, that the isomeric composition of the amine may be varied by different orders of addition of reactants. Thus, it is apparent that a whole spectrum of isomeric compositions may be obtained by varying reaction conditions; from compositions rich in nitrogen substitution at and adjacent to the beta position, to compositions rich in nitrogen substitution toward central positions in the molecule. The percentage isomeric distribution of the compositions may be determined within the limits of sensitivity of gas chromatography analytical techniques.

The secondary-alkyl primary amines of our invention have surprising physical properties when compared to presently available primary amines having the amino group at a terminal position. The amines of our invention, wherein the primary amino group is attached to an interior carbon atom of an organic molecule, have surprisingly low melting points and cloud points as shown in Table I.

TABLE I

| Amine | Degrees Centigrade | |
|---|---|---|
| | Melting Point | Cloud Point |
| $C_7$–$C_9$ secondary-alkyl primary amine | −108 | (*) |
| 3% hexyl amine | | |
| 90% octyl amine | −13 | |
| 7% decyl amine | | |
| $C_9$–$C_{11}$ secondary-alkyl primary amine | −80 | (*) |
| 4% octyl amine | | |
| 90% decyl amine | 8 | |
| 6% dodecyl amine | | |
| $C_{11}$–$C_{15}$ secondary-alkyl primary amine | −29 | −29 |
| Coco amine | 12–15 | 14.5 |
| $C_{15}$–$C_{20}$ secondary-alkyl primary amine | 10 | 12 |
| Tallow amine | 33–40 | 38 |

* According to ASTM procedures, cloud points below −36° C. are not reported.

The lower melting points and lower cloud points render the amines of our invention particularly useful as additive chemicals to utilize their cationic surface-active properties. The amines of our invention have special utility in oil production operations where cationic surface-active properties are necessary in operations at extreme temperature conditions.

Further, the secondary-alkyl primary amines of our invention have excellent reactivity as chemical intermediates for an entire new series of nitrogen derivatives.

The following examples further illustrate the novel process and products of our invention by way of specific embodiments.

EXAMPLE I

A Monel autoclave was charged with 120 gms. (6.0 moles) hydrogen fluoride, 8.65 gms. (0.38 mole) water and 49.2 gms. (1.20 moles) acetonitrile at a temperature of approximately −10° C. The autoclave was closed to the atmosphere, the temperature raised to 49° C., and 33.7 gms. (0.40 mole) 1-hexene was slowly added over a period of about 30 minutes. Stirring was continued for an additional 30 minutes at about 51–55° C. The autoclave was cooled, opened, and the contents poured into 1000 ml. cold water. 1000 ml. of ether was added and the organic phase separated. The ether solution was washed once with salt-water, once with an aqueous potassium carbonate-salt solution, then twice with salt-water, and dried over anhydrous sodium sulphate. The drying agent was filtered off and concentration in vacuo resulted in a 78.1% mass yield of product having the following properties:

Percent amide _____ 98.9
Iodine value _____ 1.30

ISOMER DISTRIBUTION BY GAS CHROMATOGRAPHY

Position of amide: Percent
2 _____ 52.3
3 _____ 47.7

EXAMPLE II

A Monel autoclave was charged with 50.5 gms. (0.30 mole) 1-dodecene and 37.9 gms. (0.92 mole) acetonitrile. The autoclave was closed and a solution of 90 gms. (4.50 moles) hydrogen fluoride and 6.48 gms. (0.36 mole) water at a temperature of 47–51° C. was pumped slowly into the reactor over a period of about 50 minutes. Stirring was continued for an additional 30 minutes while the temperature was maintained at 45–50° C. The autoclave was cooled to 10° C., opened, and the contents poured into 1500 ml. cold water. 1000 ml. of ether was added and the organic phase separated. The ether solution was washed with five salt-water cycles and dried over anhydrous sodium sulphate. Concentration in vacuo resulted in a pale-yellow oil product (88.0% mass yield) having the following properties:

Percent amide (N-(sec-dodecyl)acetamide) _____ 94.7
Iodine value _____ 0.45

ISOMER DISTRIBUTION BY GAS CHROMATOGRAPHY

| Position of amide: | Percent |
|---|---|
| 2 | 37.6 |
| 3 | 27.5 |
| 4 | 12.4 |
| 5+ | 22.5 |

EXAMPLE III

A Monel autoclave was charged with 90 gms. (4.5 moles) liquid hydrogen fluoride. The autoclave was closed and the temperature raised to 20° C. Then 37.9 gms. (0.90 mole) acetonitrile was pumped into the reactor over a period of about 12 minutes. After an additional 11 minutes stirring, the temperature was raised to about 45° C. and 50.5 gms. (0.30 mole) 1-dodecene was pumped into the reactor over a period of about 22 minutes. After an additional 11 minutes stirring, 6.48 gms. (0.36 mole) water was pumped into the reaction zone and the entire mixture stirred for an additional 18 minutes. The autoclave was cooled to about 10° C., opened, and the contents poured into cold water. Ether was added and the organic phase separated and washed free of traces of hydrogen fluoride. The ether solution was dried and concentrated to yield a pale yellow oil product (93.8% yield) having the following properties:

Monosubstituted amide _____percent__ 98.6
Iodine value _____ 4.2

ISOMER DISTRIBUTION BY GAS CHROMATOGRAPHY

| Position of amide: | Percent |
|---|---|
| 2 | 33.8 |
| 3 | 25.5 |
| 4 | 11.1 |
| 5+ | 29.6 |

EXAMPLE IV

A Monel autoclave was charged with 90 gms. (4.5 moles) liquid hydrogen fluoride, the unit secured, and the temperature raised to 20° C. Then 37.9 gms. (0.90 mole) acetonitrile was pumped into the reactor over a period of about 8 minutes. Following an additional 19 minutes of stirring, the temperature was raised to 45° C. and 50.5 gms. (0.3 mole) 1-dodecene and 6.5 gms. (0.36 mole) water were pumped into the reactor simultaneously over a period of about 20 minutes. Stirring was continued for about 20–25 minutes at 45–50° C., then the reactor cooled to 16° C., opened and the contents poured into cold water. Ether was added, the organic layer separated and washed free of traces of hydrogen fluoride. The organic layer was dried over anhydrous sodium sulphate and concentrated to result in a pale yellow oil (93.5% mass yield) having the following properties:

Monosubstituted amide _____percent__ 83.8
Iodine value _____ 3.38

ISOMER DISTRIBUTION BY GAS CHROMATOGRAPHY

| Position of amide: | Percent |
|---|---|
| 2 | 31.7 |
| 3 | 26.6 |
| 4 | 8.8 |
| 5+ | 32.9 |

EXAMPLE V

A Monel autoclave was charged with 60 gms. (3.0 moles) hydrogen fluoride, 4.32 gms. (0.24 mole) water and 24.6 gms. (0.60 mole) acetonitrile at approximately −10° C. The autoclave was closed and temperature raised to about 49° C. Then 50.5 gms. (0.20 mole) 1-octadecene was pumped into the reaction mixture at about 50° C. Stirring was continued for an additional 33 minutes while the temperature was held at about 55° C. The unit was cooled to 5° C., opened, and the contents poured into cold water. The product was ether extracted, washed and dried. Concentration in vacuo produced a white solid (96.5% mass yield) having the following properties:

Percent amide _____ 95.5
Iodine value _____ 2.7

ISOMER DISTRIBUTION BY GAS CHROMATOGRAPHY

| Position of amide: | Percent |
|---|---|
| 2 | 21.5 |
| 3 | 21.5 |
| 4 | 8.9 |
| 5+ | 48.1 |

EXAMPLE VI

A Monel autoclave was charged with 100 gms. (5.0 moles) hydrogen fluoride, 24.6 gms. (0.60 mole) acetonitrile, and 4.32 gms. (0.24 mole) water at approximately 0° C. The unit was closed and the temperature raised to about 49° C. Then 56.1 gms. (0.20 mole) oleic acid was pumped into the reactor over a period of about 33 minutes at 49–56° C. Stirring was continued for an additional 25 minutes at 56–59° C. The reaction mixture was then cooled to 10° C., autoclave opened, contents poured into cold water, and ether added. The organic phase was separated, washed, dried and concentrated resulting in a dark viscous oil product (92.1% yield) having the following properties:

Iodine value _____ 5.87
Neutralization equivalent:
    Experimental _____ 334
    Calculated _____ 341.5
Acetamidostearic acid _____percent__ 98.0

Acetamidostearic acid was determined both by perchloric acid titration of the amide function and potassium hydroxide titration of the acid function.

EXAMPLE VII

An autoclave was charged with 120 gms. (6.0 moles) liquid hydrogen fluoride at about 0° C. To this was added a solution of 38.5 gms. (0.938 mole) acetonitrile and 8.65 gms. (0.48 mole) water. The unit was closed and temperature raised to about 48° C. Then 32.9 gms. (0.40 mole) cyclohexene was pumped into the reactor over a period of about 30 minutes. Stirring was continued for an additional 30 minutes at about 50° C., the unit cooled to about 5° C. and opened. The reaction mixture was poured into cold water, ether added, the organic phase separated, washed, dried, and concentrated resulting in a white solid having an uncorrected melting point of 106.5–108° C. The reported melting point for N-cyclohexyl acetamide is 104° C. The mass yield was 57% and the amount of amide was 96.2%. Gas chromatographic analysis showed a single peak other than the solvent peak.

EXAMPLE VIII

An autoclave was charged with 100 gms. (5.0 moles) hydrogen fluoride, 4.32 gms. (0.24 mole) water, and 24.6 gms. (0.60 mole) acetonitrile at approximately 0° C. The vessel was closed and temperature raised to about 46° C. Then 53.4 gms. (0.20 mole) oleyl amine was added to the reactor over a period of about 40 minutes. Stirring was continued for an additional 30 minutes at 50–55° C. The reaction mixture was cooled to about 10° C., the reactor opened, and the contents poured into a stainless steel beaker. The bulk of the hydrogen fluoride was removed with stirring and heating at 18° to 102° C. for a period of about 55 minutes. The product was then poured into 1000 ml. of water resulting in a homogeneous solution. 157 gms. (2.8 moles) potassium hydroxide was added resulting in the formation of an oily layer which was separated. This product was extracted with 1000 ml. of ether. A large insoluble interface between the aqueous layer and ether was discarded. The ether solution was washed, dried, and concentrated, resulting in an 82.5% yield of a dark oil having the following properties:

Percent amide _____ 99.0
Iodine value _____ 6.2

EXAMPLE IX

A Monel autoclave was charged with 50 gm. (2.5 moles) of anhydrous liquid hydrogen fluoride. The autoclave was closed and the temperature raised to 31° C. By employing a dual pump, a solution of 31.3 gm. (0.76 mole) of acetonitrile and 5.4 gm. (0.30 mole) of water from one source and 45 gm. (0.25 mole) of $C_{11}$–$C_{15}$ mixed alpha-olefin from another source, was simultaneously pumped into the autoclave. The $C_{11}$–$C_{15}$ mixed alpha-olefin had the following properties:

Molecular weight (average) _____ 179
Iodine value _____ 152.5

MOLECULAR WEIGHT DISTRIBUTION

| Number of C atoms: | Weight, percent |
|---|---|
| 11 | 15 |
| 12 | 25 |
| 13 | 24 |
| 14 | 25 |
| 15 | 11 |

The reactants were introduced by pump over a period of about 40 minutes to the reactor which was maintained at a temperature of about 31 to 50° C. Stirring was continued for an additional 24 minutes while the temperature dropped from 50° to 32° C. The autoclave was cooled to 0° C., opened, and the contents poured into 1500 ml. of cold water. 1000 ml. of ether was added and the organic phase was separated and washed free of hydrogen fluoride. The ether solution was dried over anhydrous sodium sulfate. Concentration in vacuo resulted in a 95% yield of product having the following properties:

Percent amide _____ 90.7
Iodine value _____ 3.7

ISOMER DISTRIBUTION BY GAS CHROMATOGRAPHY

| Position of Amide | Percent | | | | |
|---|---|---|---|---|---|
| | $C_{11}$ | $C_{12}$ | $C_{13}$ | $C_{14}$ | $C_{15}$ |
| 2 | 28.8 | 24.7 | 23.0 | 18.3 | 13.3 |
| 3 | 28.2 | 26.6 | 22.7 | 20.0 | 16.5 |
| 4 | 43.0 (4+) | 48.7 (4+) | 54.3 (4+) | 17.6 | 12.6 |
| 5 | | | | 44.1 (5+) | 20.5 |
| 6+ | | | | | 37.1 |

EXAMPLE X

A reactor was charged with 100 gms. (5.0 moles) of anhydrous liquid hydrogen fluoride at −10° C. A solution of 62.6 gms. (1.53 moles) of acetonitrile and 10.8 gms. (0.60 mole) of water was added with stirring. During this addition, the temperature rose to 20° C. The reactor was closed and 89.5 gms. (0.50 mole) of $C_{11}$–$C_{15}$ alpha-olefin, having properties as described in Example IX, was pumped into the stirred reaction mixture at 25 to 40° C. over a period of about 60 minutes. During the addition, pressures up to about 9.5 p.s.i. developed inside the reactor. Stirring was continued for about 100 minutes, during which period the temperature dropped to 20° C. and the pressure to about 2 p.s.i. The reaction mixture was cooled to −10° C., the reactor opened, and the contents poured slowly into 1500 ml. of cold water. 1000 ml. of ether was added, the organic phase separated and washed, dried and concentrated. The resulting product represented a 93.3% yield and had the following properties:

Percent amide _____ 90.7
Nitrogen (percent), calculated __ 5.88; experimental, 5.42.
Iodine value, calculated _____ 0.0; experimental, 3.9.

The N-($C_{11}$–$C_{15}$ sec-alkyl) acetamide was hydrolyzed in alcoholic potassium hydroxide for 8½ hours at 225 to 250° C. and up to 760 p.s.i. pressure. The reaction mixture was added to water and ether extracted resulting in an amine which gave the following isomer distribution within the $C_{13}$ chain by gas chromatography:

| Amino position: | Percent |
|---|---|
| 2 | 8.3 |
| 3 | 20.1 |
| 4 | 27.6 |
| 5+ | 44.0 |

EXAMPLE XI

A reactor was charged with 45.0 gms. (0.25 mole) $C_{11}$–$C_{15}$ alpha-olefin, having properties as described in Example IX, and 31.3 gms. (0.76 mole) acetonitrile. The unit was closed and a solution of 75.0 gms. (3.75 moles) hydrogen fluoride and 5.4 gms. (0.30 mole) water was introduced into the reactor at 42–55° C. over a period of about 50 minutes with stirring. Stirring was continued for about 30 minutes, the reaction mixture cooled to about 10° C., poured into cold water, extracted with ether, washed, dried, and concentrated in vacuo yielding a pale yellow oil (98.1% mass yield) having the following properties:

Percent amide _____ 90.2
Iodine value _____ 3.9

ISOMER DISTRIBUTION BY GAS CHROMATOGRAPHY

| Position of Amide | Percent | | | | |
|---|---|---|---|---|---|
| | $C_{11}$ | $C_{12}$ | $C_{13}$ | $C_{14}$ | $C_{15}$ |
| 2 | 37.4 | 35.9 | 32.0 | 30.1 | 27.7 |
| 3 | 28.8 | 27.5 | 25.3 | 26.1 | 27.2 |
| 4 | 15.6 | 16.8 | 19.8 | 17.1 | 14.0 |
| 5 | 18.2 (5+) | 19.8 (5+) | 10.4 | 12.4 | 12.7 |
| 6+ | | | 12.5 | 14.3 | 18.4 |

EXAMPLE XII

An autoclave was charged with 54.0 gms. (0.30 mole) $C_{11}$–$C_{15}$ alpha-olefin, having properties as described in Example IX, and 37.9 gms. (0.90 mole) acetonitrile. The vessel was closed and a solution of 90.0 gms. (4.50 moles) hydrogen fluoride and 6.48 gms. (0.36 mole) water was continuously introduced into the reaction mixture over a period of about 55 minutes at a temperature of 45–50° C. The reaction was allowed to proceed for an additional 30 minutes at about 50° C. The unit was then cooled to about 10° C., opened, and the contents poured into a stainless steel beaker.

The reaction mixture was heated with stirring over a period of about 30 minutes at 20–160° C., and then for an additional 34 minutes at 80–160° C. At this point, 1.13 moles of hydrogen fluoride per mole of olefin was still present. The mixture was then maintained at 70–200° C. and stirred for an additional 55 minutes. The reaction mixture was then poured into cold water, extracted with ether, washed, dried, and concentrated resulting in a 91.0% mass yield of a dark-brown oil having the following properties:

Percent amide _____ [1] 100
Iodine value _____ 1.7

[1] By infrared analysis and by perchloric acid titration.

ISOMER DISTRIBUTION BY GAS CHROMATOGRAPHY

| Position of Amide | Percent | | | | |
|---|---|---|---|---|---|
| | $C_{11}$ | $C_{12}$ | $C_{13}$ | $C_{14}$ | $C_{15}$ |
| 2 | 36.1 | 32.4 | 32.9 | 31.0 | 31.3 |
| 3 | 29.1 | 27.6 | 27.1 | 25.1 | 26.9 |
| 4 | 34.8 (4+) | 17.6 | 13.9 | 16.4 | 14.5 |
| 5 | | 22.4 (5+) | 26.1 (5+) | 8.9 | 10.4 |
| 6+ | | | | 18.6 | 16.9 |

EXAMPLE XIII

A reactor was charged with 80 gms. (4.0 moles) hydrogen fluoride, 24.5 gms. (0.905 mole) hydrogen cyanide and 10.8 gms. (0.60 mole) of water at −10° C. The reactor was closed and temperature brought to 20° C. Then 89.5 gms. (0.50 mole) of $C_{11}$–$C_{15}$ alpha-olefin, having properties as described in Example IX, were pumped into the reactor at a temperature of 20 to 40° C. over a period of 60 minutes. Stirring was continued for an additional 60 minutes at 22 to 38° C. The reaction mixture was cooled to −10° C. and poured into 1500 ml. of cold water. The product was ether extracted and the extract washed twice with water, once with a dilute sodium hydroxide solution, and twice with salt water. The ether-amide solution was dried over anhydrous sodium sulfate. The drying agent was filtered off and concentration in vacuo gave 91.7% yield of product having the following properties:

Percent amide _____ 82.4.
Nitrogen (percent), calculated 6.25; experimental, 5.67.
Iodine value, calculated _____ 0.0; experimental, 9.34.

The N-($C_{11}$–$C_{15}$ sec-alkyl) formamide was hydrolyzed in alcoholic sodium methoxide. The reactants were refluxed for about 70 hours at 79° C. The solvent was removed by vacuum and the residue added to water and ether extracted. The resulting amine gave the following isomer distribution within the $C_{13}$ chain by gas chromatography:

Amine position: Percent
2 _____ 9.5
3 _____ 25.0
4 _____ 30.0
5+ _____ 35.5

EXAMPLE XIV

The reaction was carried out as in Example XIII except that the total reaction time was 142 minutes and 5 moles of hydrogen fluoride were used. At the end of the reaction, the mixture was transferred to a stainless steel beaker. The contents were heated to 40–170° C. for 5 hours with stirring. The product was obtained in essentially quantitative yield and had the following properties:

Percent amide _____ 78.3.
Nitrogen (percent), calculated 6.24; experimental, 6.46.
Iodine value, calculated _____ 0.0; experimental, 3.3.

EXAMPLE XV

A reactor was charged with 54 gms. (0.30 mole) $C_{11}$–$C_{15}$ alpha-olefin, having properties as described in Example IX. The reactor was closed and 24.3 gms. (0.90 mole) hydrogen cyanide and a solution of 90 gms. (4.50 moles) hydrogen fluoride and 6.48 gms. (0.36 mole) water were introduced simultaneously through two pumps over a period of about 44 minutes and at 45–50° C. The hydrogen cyanide was pumped directly into the olefin and the hydrogen fluoride-water was pumped into the free space above the liquid. Stirring was continued for about 30 minutes at about 50° C., the mixture cooled to about 0° C., the reactor opened, and the reaction mixture divided into two portions: (1) 48.2% was processed further by driving the hydrogen fluoride off by heating, and (2) 51.8% was worked up by water treatment and extraction of the product, N-($C_{11}$–$C_{15}$ sec-alkyl) formamide.

1. Heat treatment

A portion of the reaction product was heated with stirring at 10–170° C. for about 30 minutes and then 80–170° C. for an additional 15 minutes. At this point, 0.83 mole hydrogen fluoride was present per mole amide expected. Heating with stirring was continued for about 12 minutes at 45–200° C. at the end of which 98.4% yield of a dark, viscous oil was obtained. The crude product was poured into water, ether extracted, washed, dried and concentrated giving a dark oil product in 86.5% yield and having the following properties:

Percent amide _____ 90.3
Iodine value _____ 2.2

ISOMER DISTRIBUTION BY GAS CHROMATOGRAPHY

| Position of Amide | Percent | | | | |
|---|---|---|---|---|---|
| | $C_{11}$ | $C_{12}$ | $C_{13}$ | $C_{14}$ | $C_{15}$ |
| 2 | 23.4 | 21.9 | 23.3 | 22.9 | 19.5 |
| 3 | 29.1 | 30.7 | 28.3 | 27.5 | 26.8 |
| 4 | 47.5 (4+) | 47.4 (4+) | 17.2 | 18.5 | 20.8 |
| 5 | | | 31.2 (5+) | 31.1 (5+) | 12.0 |
| 6+ | | | | | 20.9 |

2. Water treatment

A portion of the reaction product was poured into water, ether extracted, washed, dried and concentrated giving a yellow oil product in 94.9% yield and having the following properties:

Percent amide _____ 85.6
Iodine value _____ 4.08

ISOMER DISTRIBUTION BY GAS CHROMATOGRAPHY

| Position of Amide | Percent | | | | |
|---|---|---|---|---|---|
| | $C_{11}$ | $C_{12}$ | $C_{13}$ | $C_{14}$ | $C_{15}$ |
| 2 | 25.5 | 21.8 | 25.9 | 22.2 | 19.7 |
| 3 | 28.1 | 27.9 | 27.2 | 26.9 | 26.2 |
| 4 | 46.4 (4+) | 50.3 (4+) | 15.2 | 17.9 | 19.6 |
| 5 | | | 31.7 (5+) | 32.9 (5+) | 12.4 |
| 6+ | | | | | 22.1 |

EXAMPLE XVI

Alpha-olefin, $C_{20}$+ fraction having the following properties was used in this preparation:

| Olefin Type | Percent by Mole | Carbon No. | Percent by Wt. |
|---|---|---|---|
| RCH=CHR trans | 2.4 | $C_{20}$ | 20.3 |
| RCH=CH | 60.8 | $C_{22}$ | 16.7 |
| R C=CH | 13.8 | $C_{24}$ | 13.7 |
| R C=CHR | 13.3 | $C_{26}$ | 10.9 |
| RCH=CHR cis | 9.7 | $C_{28}$ | 8.5 |
| | | $C_{30}$ | 6.9 |
| | | $C_{32}$ | 5.6 |
| | | $C_{34}$ | 4.4 |
| | | $C_{36}$ | 3.4 |
| | | $C_{38}$ | 2.7 |
| | | $C_{40}$ | 2.1 |
| | | $C_{42}$ | 1.7 |
| | | $C_{44}$ | 1.3 |
| | | $C_{46}$ | 0.8 |

Iodine value 56.6. Apparent Molecular Weight 448

A reactor was charged with 33.6 gms. (0.075 mole) of the above described $C_{20}$+ alpha-olefin and 12.3 gms. (0.3 mole) acetonitrile. The reactor was closed and the temperature raised to about 50° C. Then 45 gms. (2.25 moles) liquid hydrogen fluoride containing 2 gms. (0.11 mole) water was added to the reactor over a period of about 25 minutes. Stirring was continued for about 60 minutes at 55–60° C. The reactor was cooled to 15° S., opened, and the contents added to water. The product was extracted with methylene chloride, and the extract washed, dried and concentrated in vacuo to give a 92% mass yield of a brown solid having the following properties:

Monosubstituted amide _____ percent__ 82.7
Iodine value _____ 1.96

EXAMPLE XVII

A stainless steel autoclave was charged with 1 mole N-($C_{11}$–$C_{15}$ sec-alkyl) acetamide (94% amide, 1.2% water), 1.1 moles methanol, 1.95 moles water, and 1.75 moles flaked sodium hydroxide. The temperature was raised to about 227° C. over a period of about 80 minutes during which time a pressure of about 310 p.s.i. developed. The reaction proceeded at 227°–230° C. and 310–320 p.s.i. for 9 hours. During the reaction samples were periodically withdrawn and analyzed as follows:

| Time (hours) | Neutralization equivalent (Calculated 196) |
|---|---|
| 4 | 212 |
| 6 | 209 |
| 9 | 205 |

The reaction mixture was cooled to room temperature and about 51 moles of water added. The aqueous phase was separated and vacuum distillation of the crude amine gave about an 80% yield of a pale yellow product having the following properties:

Neutralization equivalent _____ 203
Primary amine _____ percent__ 97.3
Color (Gardner) _____ 1

ISOMER DISTRIBUTION BY GAS CHROMATOGRAPHY

| Position of Amino Group | Percent | | | | |
|---|---|---|---|---|---|
| | $C_{11}$ | $C_{12}$ | $C_{13}$ | $C_{14}$ | $C_{15}$ |
| 2 | 35.2 | 35.7 | 33.7 | 35.3 | 34.2 |
| 3 | 39.9 | 35.8 | 35.7 | 33.8 | 32.8 |
| 4 | 18.9 | 19.0 | 17.1 | 15.6 | 14.5 |
| 5 | 6.0 (5+) | 5.0 | 6.1 | 7.1 | 9.8 |
| 6 | | 4.5 | 7.4 (6+) | 8.2 (6+) | 5.0 |
| 7+ | | | | | 3.7 |

The foregoing specification has set out specific process conditions, reactants, proportions, product compositions and other factors in considerable detail for the purpose of illustrating some embodiments of our invention. It is clear that these may be varied widely by those skilled in the art without departing from the spirit of our invention.

We claim:

1. A process for preparing secondary-alkyl primary amines comprising reacting an olefin with a nitrile and water in the presence of hydrogen fluoride to form an intermediate product, then reacting the intermediate product with a hydrolysis agent to form said amines, and separating said amines from the reaction mixture.

2. The process of claim 1 wherein the olefin has the structure

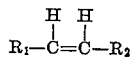

and $R_1$ is selected from the group consisting of hydrogen, an aryl radical, and an aliphatic hydrocarbon radical, $R_2$ is selected from the group consisting of an aryl radical and an aliphatic hydrocarbon radical; and wherein the total molecule contains from 3 to about 48 carbon atoms.

3. The process of claim 1 wherein the nitrile has the structure $R'C \equiv N$ and $R'$ is selected from the group consisting of hydrogen, an aliphatic hydrocarbon radical having from 1 to about 21 carbon atoms, an aryl radical, an amino radical, and metallic salts of an amino radical.

4. The process of claim 1 wherein the hydrolysis agent is selected from the group consisting of aqueous sulfuric acid, aqueous sodium hydroxide, sodium hydroxide in alcohol and aqueous alcohol, aqueous potassium hydroxide, potassium hydroxide in alcohol and aqueous alcohol, and sodium methoxide in alcohol, the concentration being from about 30 to 70 percent.

5. The process of claim 1 wherein the mole ratio of nitrile to olefin is from about 1.1 to about 4.

6. The process of claim 1 wherein the mole ratio of hydrogen fluoride to olefin is greater than about 3.

7. The process of claim 1 wherein the mole ratio of hydrogen fluoride to olefin is from about 8 to 25.

8. The process of claim 1 wherein the mole ratio of water to olefin is in excess of about 1.0.

9. The process of claim 1 wherein the mole ratio of water to olefin is from about 1.0 to 1.3.

10. The process of claim 1 wherein the temperature during the olefin-nitrile-water reaction is from about −20° to 100° C. and the temperature during the hydrolysis reaction is from about 50° to 300° C.

11. A process for preparing secondary-alkyl primary amines comprising reacting an alpha-olefin with a nitrile and water in the presence of hydrogen fluoride at a temperature from about 25° to 60° to form an intermediate product, then reacting the intermediate product with a hydrolysis agent at a temperature from about 50° to 300° C. to form said amines, and separating said amines from the reaction mixture.

12. A process for preparing an isomeric mixture, of secondary-alkyl primary amines from olefins, said mixture being rich in isomers wherein the point of attachment of the nitrogen atom is removed from the site of the original location of the double bond in the olefin molecule, comprising mixing a nitrile, water and hydrogen fluoride, then adding an olefin to the mixture, subjecting said mixture to reaction conditions to form N-monosubstituted secondary-alkyl amide intermediate products, then reacting the intermediate products with a hydrolysis reagent to form said amines, and separating said amines from the reaction mixture.

13. A process for preparing an isomeric mixture of secondary-alkyl primary amines from olefins, said mixture being rich in isomers wherein the point of attachment of the nitrogen atom is at and adjacent to the site of the original location of the double bond in the olefin molecule, comprising mixing a nitrile, water, hydrogen fluoride, and an olefin, said olefin being added prior to the last reactant, subjecting said mixture to reaction conditions to form N-monosubstituted secondary-alkyl amide intermediate products, then reacting the intermediate products with a hydrolysis reagent to form said amines, and separating said amines from the reaction mixture.

14. In a process for preparing secondary-alkyl primary amines, the steps comprising reacting one molecule of an olefin with one molecule of a nitrile and one molecule of water in the presence of hydrogen fluoride to form N-monosubstituted secondary-alkyl amide intermediate products, and separating said products from the reaction mixture.

15. In a process for preparing an isomeric mixture of secondary-alkyl primary amines from olefins, said mixture being rich in isomers wherein the point of attachment of the nitrogen atom is removed from the site of the original location of the double bond in the olefin molecule, the steps comprising mixing a nitrile, water and hydrogen fluoride, then adding an olefin to the mixture, reacting the mixture to form N-monosubstituted secondary-alkyl amides, and separating said amides from the reaction mixture.

16. In a process for preparing an isomeric mixture of secondary-alkyl primary amines from olefins, said mixture being rich in isomers wherein the point of attachment of the nitrogen atom is at and adjacent to the site of the original location of the double bond in the olefin molecule, the steps comprising mixing a nitrile, water, hydrogen fluoride, and an olefin, said olefin being added prior to the last reactant, reacting the mixture to form N-monosubstituted secondary-alkyl amides, and separating said amides from the reaction mixture.

17. A process for preparing an isomeric mixture of $C_{11}$–$C_{15}$ secondary-alkyl primary amines rich in isomers wherein the point of attachment of the nitrogen atom is removed from the beta-carbon atom toward the center of the carbon chain, comprising the steps; mixing hydrogen fluoride, acetonitrile and water at a temperature of less than 20° C., then adding to the mixture $C_{11}$–$C_{15}$ alpha-olefin at a temperature of from about 25° to 60° C., stirring the reaction mixture for about 100 minutes to form N-($C_{11}$–$C_{15}$ sec-alkyl) acetamide, hydrolyzing said amide in the presence of sodium hydroxide-aqueous alcohol hydrolysis agent at a temperature from about 150° to 250° C., and separating said amines from the reaction mixture; said hydrogen fluoride, acetonitrile, water and alpha-olefin being added in mole ratios of about 10:3:, 1.2:, 1.0 respectively.

18. A process for preparing an isomeric mixture of $C_{11}$-$C_{15}$ secondary-alkyl primary amines rich in isomers wherein the point of attachment of the nitrogen atom is at and adjacent to the beta-carbon atom, comprising the steps: mixing acetonitrile, $C_{11}$-$C_{15}$ alpha-olefin, hydrogen fluoride and water, said alpha-olefin being added prior to the last reactant, stirring the reaction mixture for about 80 minutes at a temperature of about 50° C., to form N-($C_{11}$-$C_{15}$ sec-alkyl) acetamide, hydrolyzing said amide in the presence of sodium hydroxide-aqueous alcohol hydrolysis agent at a temperature from about 150° to 250° C., and separating said amines from the reaction mixture; said hydrogen fluoride, acetonitrile, water and alpha-olefin being added in the mole ratios of about 15:3:, 1.2:, 1.0 respectively.

19. In a process for preparing N-secondary-alkyl primary amines, the steps of reacting a substituted aliphatic olefinic compound, wherein the substituted component is selected from the group consisting of carboxy and amino radicals, with a nitrile and water in the presence of hydrogen fluoride to form N-secondary-alkyl amide.

References Cited

UNITED STATES PATENTS

| | | | |
|---|---|---|---|
| 2,719,176 | 9/1955 | Coover et al. | 260—561 |
| 2,819,307 | 1/1958 | Albert | 260—561 |
| 2,820,801 | 1/1958 | De Benneville et al. | 260—404 |

OTHER REFERENCES

Houben-Weil, Methoden der Organischen Chemie (1957), vol. 11/1, pp. 927, 931, QD 258H7.

ALEX MAZEL, *Primary Examiner.*

J. A. NARCAVAGE, *Assistant Examiner.*